United States Patent [19]
Lofthus et al.

[11] Patent Number: 5,517,230
[45] Date of Patent: May 14, 1996

[54] CONTROL SYSTEM FOR A VARIABLE-RESOLUTION RASTER OUTPUT SCANNER

[75] Inventors: Robert M. Lofthus, Honeoye Falls; John A. Durbin, Webster; Aron Nacman, Penfield, N.Y.; James J. Appel, Rochester, all of N.Y.

[73] Assignee: Xerox Corporation, Stamford, Conn.

[21] Appl. No.: 308,222

[22] Filed: Sep. 19, 1994

[51] Int. Cl.$^6$ .................................................. H04N 1/47
[52] U.S. Cl. ..................... 347/235; 347/250; 347/261; 347/248; 347/249; 347/234
[58] Field of Search .................................. 346/108, 160; 358/298; 364/561, 565; 347/248, 249, 234, 235, 250, 247, 237, 261

[56] References Cited

U.S. PATENT DOCUMENTS

| | | | |
|---|---|---|---|
| 4,578,689 | 3/1986 | Spencer et al. | 347/250 |
| 4,704,698 | 11/1987 | Reiniger | 347/261 |
| 4,807,156 | 2/1989 | Parisi | 364/519 |
| 5,043,966 | 8/1991 | Zwaans | 358/337 |
| 5,083,140 | 1/1992 | Peterson et al. | 347/248 |
| 5,237,521 | 8/1993 | Raj et al. | 364/561 |
| 5,239,313 | 8/1993 | Marko et al. | 346/108 |
| 5,264,870 | 11/1993 | Egawa | 347/248 |
| 5,305,023 | 4/1994 | Fukushige et al. | 347/235 |
| 5,337,076 | 8/1994 | Agano | 347/261 |

*Primary Examiner*—Benjamin R. Fuller
*Assistant Examiner*—Raquel Y. Gordon
*Attorney, Agent, or Firm*—R. Hutter

[57] ABSTRACT

A raster output scanner is capable of creating images at a wide range of selectable resolutions. A laser source for creating an image is modulated at a pixel clock rate. A clock command value is determined as a function of a value related to the pixel clock rate and a value related to a desired resolution in the fast-scan direction and a desired resolution in the slow-scan direction of an image to be created on the photosensitive surface. The pixel clock rate is controlled in response to the clock command value. A polygon command value is determined as a function of the value related to the pixel clock rate, a value related to a desired resolution in the fast-scan direction of an image to be created on the photosensitive surface, and a value related to a rotational velocity of the polygon mirror. The rotational velocity of the polygon mirror is controlled in response to the polygon command value.

10 Claims, 3 Drawing Sheets

CONTROL SYSTEM FOR A VARIABLE-RESOLUTION RASTER OUTPUT SCANNER

This application incorporates by reference U.S. Pat. No. 5,237,521, assigned to the assignee hereof.

The present invention relates to a control system for a raster output scanner (ROS), such as in an electrophotographic printing machine, which enables the ROS to create images of selectable resolution.

Electrophotographic printers wherein a laser scan line is projected onto a photoconductive surface are well known. In the case of laser printers, facsimile machines, and the like, it is common to employ a raster output scanner (ROS) as a source of signals to be imaged on photographic film or an electrostatically charged photoreceptor (a photosensitive plate, belt, or drum) for purposes of printing. The ROS provides a laser beam which switches on and off according to electronic image data associated with the desired image to be printed as the beam moves, or scans, across the charged photoreceptor. Commonly, the surface of the photoreceptor is selectively imagewise discharged by the laser beam in locations to be printed white, to form the desired image on the photoreceptor. Modulation of the scanned beam creating the desired latent image on the photoreceptor is typically implemented by digitally controlling the output of a high speed laser diode or a modulator associated with a continuous laser source. A common technique for deflecting the modulated laser beam to form a scan line across the photoreceptor surface uses a rotating optical polygon with reflecting surfaces; the laser beam from the source is reflected by the facets of the polygon, creating a scanning motion of the beam, which is optically focused to form a sharp scan line across the photoreceptor. A closely spaced regular array of scan lines on a photoreceptor together form a raster of the desired latent image. Once a latent image is formed on the photoreceptor, the latent image is subsequently developed with toner, and the developed image is transferred to a sheet, as in the well-known process of electrophotography.

As printing systems which use raster output scanners become more sophisticated, and as document-management systems become more "distributed" (i.e., as individual printing apparatus become expected to interact with other devices), each individual printing machine will have a premium placed on its versatility. If it is desired that a single printer should serve many "clients," the printer must be able to accept image data from different types of image-processing devices which are made by disparate manufacturers, and which use different systems of organizing image data. One key parameter of any given image data to which a printer must adapt is resolution: the number of possible spots per unit length on the printed image. As is well known, different systems from different manufacturers tend to output, and therefore would prefer to accept, images of different resolutions; further, the requirements of facsimile data represent another constraint on data which can be sent to a printer of a given design. Typical resolutions which are common in the market are 300 SPI (Spots Per Inch), 360 SPI, 400 SPI, and 600 SPI. It is also common in the art to have printers which are designed to output one resolution in one dimension and another resolution in another dimension, such as 300×600 SPI. Generally, in the prior art, most printing machines operate on the principle that the individual machine is of a fixed resolution, and therefore any data being supplied to the machine would have to be converted in order to be output correctly. If, for example, data consistent with 600 SPI resolution is fed into a printing machine expecting 300 SPI resolution, the most notable defect would be that the image intended to be produced, being effectively doubled in each dimension and therefore quadrupled in area, would simply not fit on the photoreceptor of the printing machine, if indeed the data could be accepted at all. It is therefore desirable that a printer should be able to accept, and also print out, image data of any reasonable resolution, without having to convert the data to the fixed resolution inherent to the machine.

U.S. Pat. No. 4,807,156 discloses an image print magnification system for a ROS scanner wherein the operation of the scanner is controlled by a master clock, which outputs a consistent relatively high frequency. This high-precision output from the clock is converted down to a more usable frequency by the various motors in the scanning system by means of "cycle stealers", which reduce the frequency of the crystal clock by blocking out regular subsets of the clock outputs.

U.S. Pat. No. 5,237,521, incorporated herein by reference, discloses a "high resolution position measurement system" which determines the cumulative position and average velocity of a rotating body, such as a stepper or servo motor, as would be found in an electrophotographic printer. The advantage of this particular design described in the patent is that it avoids cumulative errors which may result from miscounting of fractional portions of signal cycles from encoders associated with a motor. Further, the design of the system in this patent is capable of outputting a digital word representative of either the position of velocity of the rotating body. The system of this patent thus enables very precise position and velocity control of any number of stepper or servo motors with negligible error propagation.

U.S. Pat. No. 5,239,313 discloses a laser printer which is capable of printing output of a selected resolution between 75 SPI and 900 SPI, by changing various combinations of the laser spot size, paper motion speed, video data rate, and scanner speed.

According to the present invention, there is provided a method of controlling a raster output scanner having a light source for emitting a modulated beam according to digital data at a pixel clock rate and a rotatable polygon mirror for causing the modulated beam to scan across a surface in a fast-scan direction. A clock command value is determined as a function of the pixel clock rate and a value related to the desired resolutions in the fast-scan and slow-scan directions of an image to be created on the surface. The pixel clock rate is controlled in response to the clock command value. A polygon command value is determined as a function of the value related to the pixel clock rate, a value related to a desired resolution in the fast-scan direction of an image to be created on the photosensitive surface, and a value related to a rotational velocity of the polygon mirror. The rotational velocity of the polygon is controlled in response to the polygon command value.

According to another aspect of the present invention, there is provided a raster output scanner comprising a light source for emitting a modulated beam according to digital data at a pixel clock rate and a rotatable polygon mirror for causing the modulated beam to scan across a surface in a fast-scan direction. A clock command value is determined as a function of a value related to the pixel clock rate and a value related to a desired resolutions in the fast-scan and slow-scan directions of an image to be created on the surface. The pixel clock rate is controlled in response to the clock command value. A polygon command value is determined as a function of the value related to the pixel clock rate, a value related to a desired resolution in the fast-scan direction of an image to be created on the photosensitive surface, and a value related to a rotational velocity of the polygon mirror. The rotational velocity of the polygon is controlled in response to the polygon command value.

Figure 1:
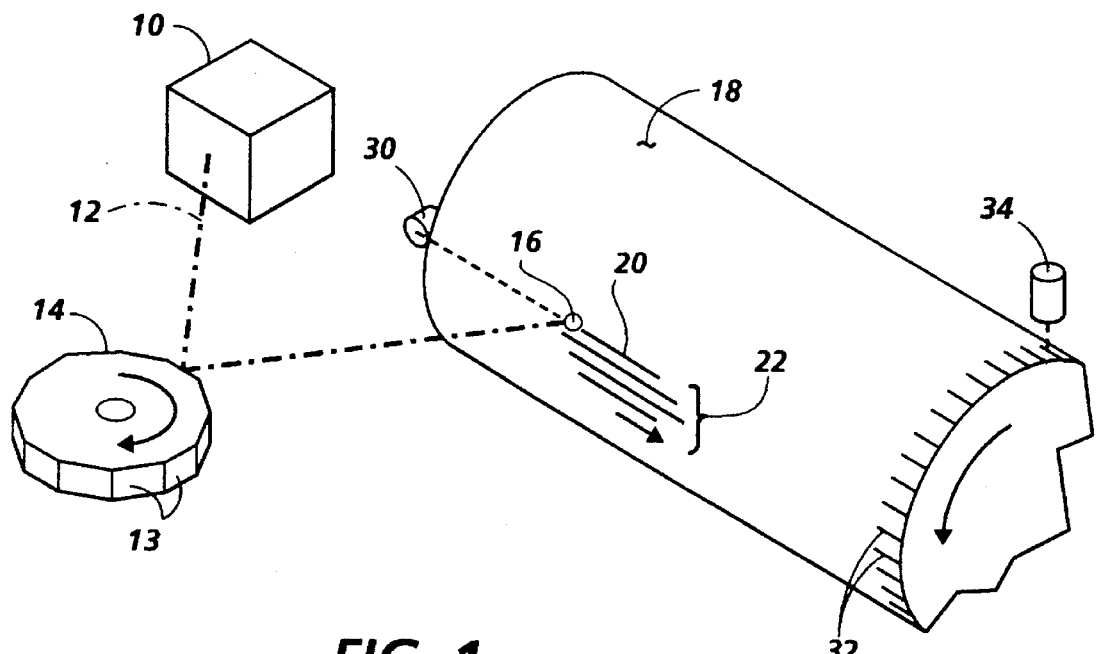
FIG. 1 is an elevational view showing the basic elements of a ROS as used with the system of the present invention.

FIG. 1 shows the basic configuration of a scanning system used, for example, in an electrophotographic printer or facsimile machine. A laser source 10 produces a collimated laser beam, also referred to as a "writing beam," 12 which is reflected by the facets of a rotating polygon 14. Each facet 13 of the polygon 14 in turn deflects the writing beam 12 to create an illuminated spot 16 on the pre-charged surface of photoreceptor 18, which in this case is a rotating drum. Laser source 10 also includes means for modulating the beam 12 according to image data entered therein. The localized light flux in spot 16 incident at a particular location on the surface of photoreceptor 18, corresponding to a picture element (pixel) in the desired image, discharges the surface for pixels of the desired image which are to be printed white. In locations having pixels which are to be printed black, writing beam 12 is momentarily interrupted through the action of the modulator within source 10, so that the pixel at that location on the surface of photoreceptor 18 will not be discharged. Thus, digital data input into laser source 10 is rendered line by line as an electrostatic latent image on the photoreceptor 18.

The rotational motion of polygon 14 results in a spot 16 moving across photoreceptor 18 to form a scan line 20 of selectively discharged areas on photoreceptor 18. At the same time, the surface of photoreceptor 18 is translated at a constant velocity (by a motor, not shown) so that the periodic scanning of spot 16 across the moving photoreceptor 18 creates an even, closely spaced array of scan lines 20, called a raster 22, on the photoreceptor 18, forming the desired continuous image to be printed. Such a configuration as in FIG. 1 may further include any number of lenses, mirrors and translational mechanisms to accommodate a specific design. Also, as is known in the art of electrophotography, the associated charging and development systems (not shown) associated with photoreceptor 18 may be adapted so that either the charged or discharged areas of the electrostatic latent image correspond to "print-black" areas in the printed image.

In addition to the basic image-making elements of a ROS shown in FIG. 1, there is, in a practical system, any number of control features to ensure that latent images are precisely and accurately placed on the surface of photoreceptor 18. In order to create high-quality images, there must be precise and accurate coordination of the motion of the photoreceptor 18, the motion of the polygon 14, and the timing and clock rate of digital data used to modulate the beam from source 10. In the prior art there has been proposed any number of schemes for obtaining the necessary feedback for monitoring the exact physical positions and velocities of the various parts. Typical of such means for obtaining feedback include the start-of-scan detector indicated as 30, and the encoder marks 32 on one edge of photoreceptor 18 which are monitored by a photoelectric device such as 34. The function of the start-of-scan detector 30 is to detect, at the beginning of each scan, a portion of the beam 12 reflected from a facet of polygon 14. As can be seen, the start-of-scan detector 30 is in the form of a photosensor placed in a position consistent with the beginning of each scan line 20 on photoreceptor 18. When light from beam 12 is detected on the start-of-scan detector 30, the system as a whole obtains precise information that the polygon 14 is in a position to start a new scan line 20, and therefore the apparatus for modulating the light beam from source 10 will be signalled precisely when to begin a new line of data. Similarly, the encoder marks 32 at the edge of photoreceptor 18 provide positional references for the motion of photoreceptor 18 as it is moved by a motor (not shown), and the frequency of the dark areas of the encoder marks 32 as they pass under photoelectric element 34 provide a strobe source by which the velocity of the photoreceptor 18 can be determined.

There is shown in FIG. 1 only the most rudimentary types of start-of-scan and encoder devices, and there exists in the prior art any number of relatively sophisticated systems for accomplishing this basic function. It will be assumed that any compatible system for determining the position or velocity of photoreceptor 18, or the start-of-scan position of polygon 14, will be suitable under the claimed invention. It will also be apparent that in addition to detecting the light beam 12, or the encoder marks 30, such position or velocity detecting means may relate directly to the behavior of the motors controlling the photoreceptor 18 and/or the polygon 14.

Figure 2:
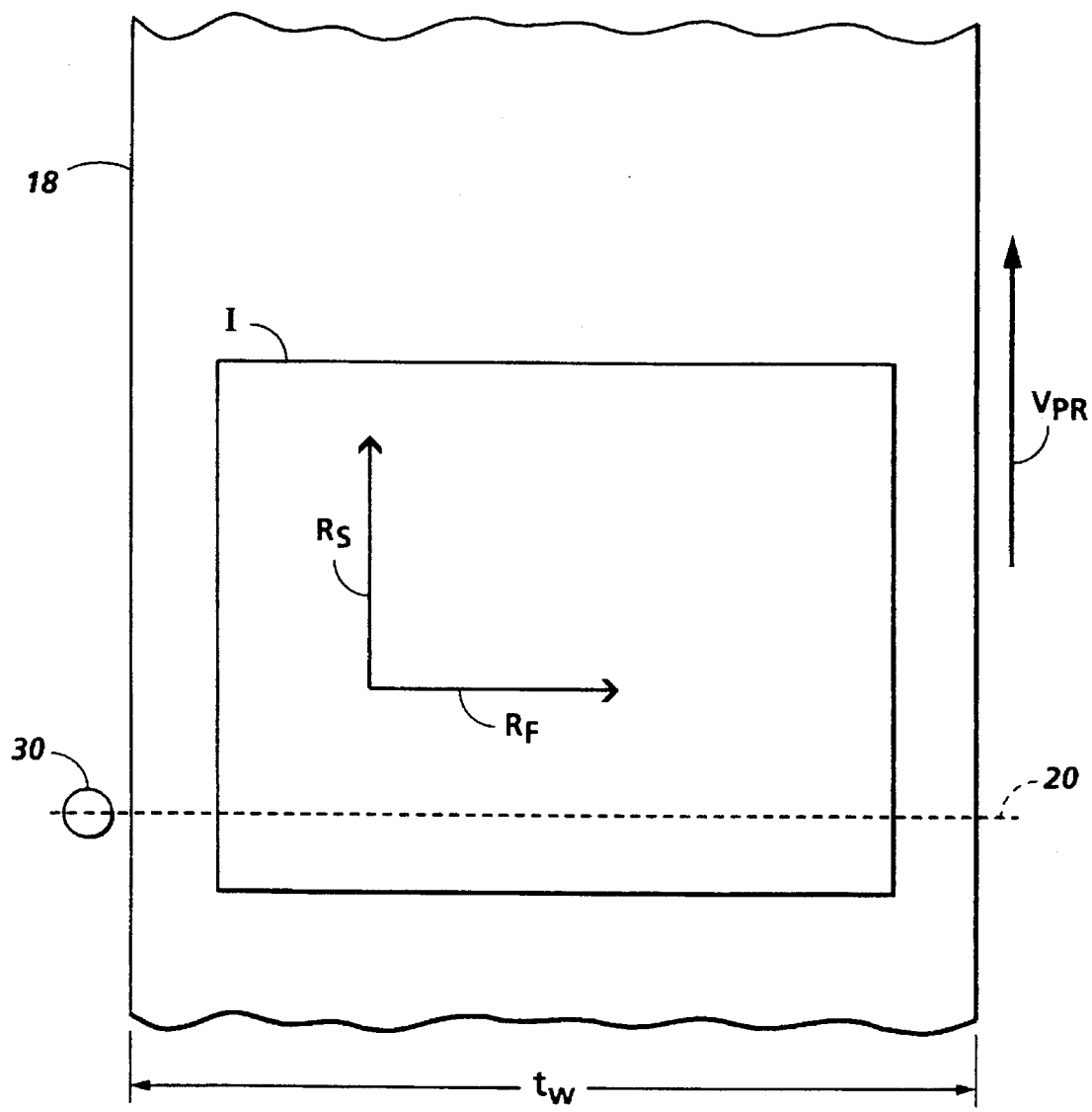
FIG. 2 is a view of a portion of a photoreceptor, illustrating the physical parameters used by the system of the present invention.

FIG. 2 shows photoreceptor 18 as "viewed" by the polygon 14, illustrating some of the key terms by which the control system of the present invention controls the resolution of an image formed on the photoreceptor 18. As shown in FIG. 2 the boundaries of an image I, such as a page to be printed, are shown as a subset of the area of the photoreceptor 18. It is typical in the design of printing machines that the usable boundary of an image I is well spaced from the edges of the photoreceptor 18, as shown. A representative scan line 20 is shown in FIG. 2; it will be noted that while a spot from polygon 14 will pass through the image I and extend over the edges of the photoreceptor 18, only a portion of the scan line 20 is actually used to form a desired image. As can be seen in FIG. 2, the entire width of the photoreceptor 18 is indicated as $t_w$. The width $t_w$ will be assumed to be used for imaging in its entirety for this example, although ground strips or similar structures often incorporated into the photoreceptor design are not capable of holding an electrostatic image. The proportion of a scan line that can be used for imaging is known as the "scan efficiency" of a ROS design. The actual length of a scan line depends on a number of geometric factors relating to the relative placement of the laser source 10 to the rotating polygon mirror 14, and number size of the facets 13. It is sufficient for the discussion that follows to note only that the actual length of scan line 20 is just the target width $t_w$, divided by the scan efficiency.

Photoreceptor 18 is shown in FIG. 2 as moving at a velocity $V_{PR}$ in the direction shown. As the photoreceptor 18 moves, the polygon 14 causes a number of scan lines 20 to form a raster 22 in the area of image I. $R_F$, the fast scan resolution, is the number of spots per linear unit which are placed on the photoreceptor 18, and is generally a function of the relative speed of modulation of the laser source 10 and the rotational speed of the polygon 14. For example, assuming a constant rate of image modulation from laser source 10, the slower the polygon 14 rotates, the closer together the spots will be placed on photoreceptor 18, and therefore the higher the fast scan resolution $R_F$. The slow scan resolution $R_S$ is expressed in raster lines per linear unit along the direction of motion of the photoreceptor 18, and is generally a function of the rotational speed of the polygon 14 and surface velocity of the photoreceptor 18. The faster the $V_{PR}$ of photoreceptor 18, the farther apart successive scan lines 20 will be in forming a raster 22, and therefore the lower the slow scan resolution $R_S$. The faster the rotational speed of the polygon 14, the closer together sucessive lines 20 will be in forming raster 22, and therefore the higher the slow scan resolution $R_S$. The resolution of spots placed on the image I can thus be affected in two dimensions by manipulating, respectively, the speed of polygon 14 (which controls both fast scan resolution $R_F$ and slow scan resolution $R_S$) and the velocity of the photoreceptor $V_{PR}$ (which controls the slow scan resolution $R_S$).

Figure 3:
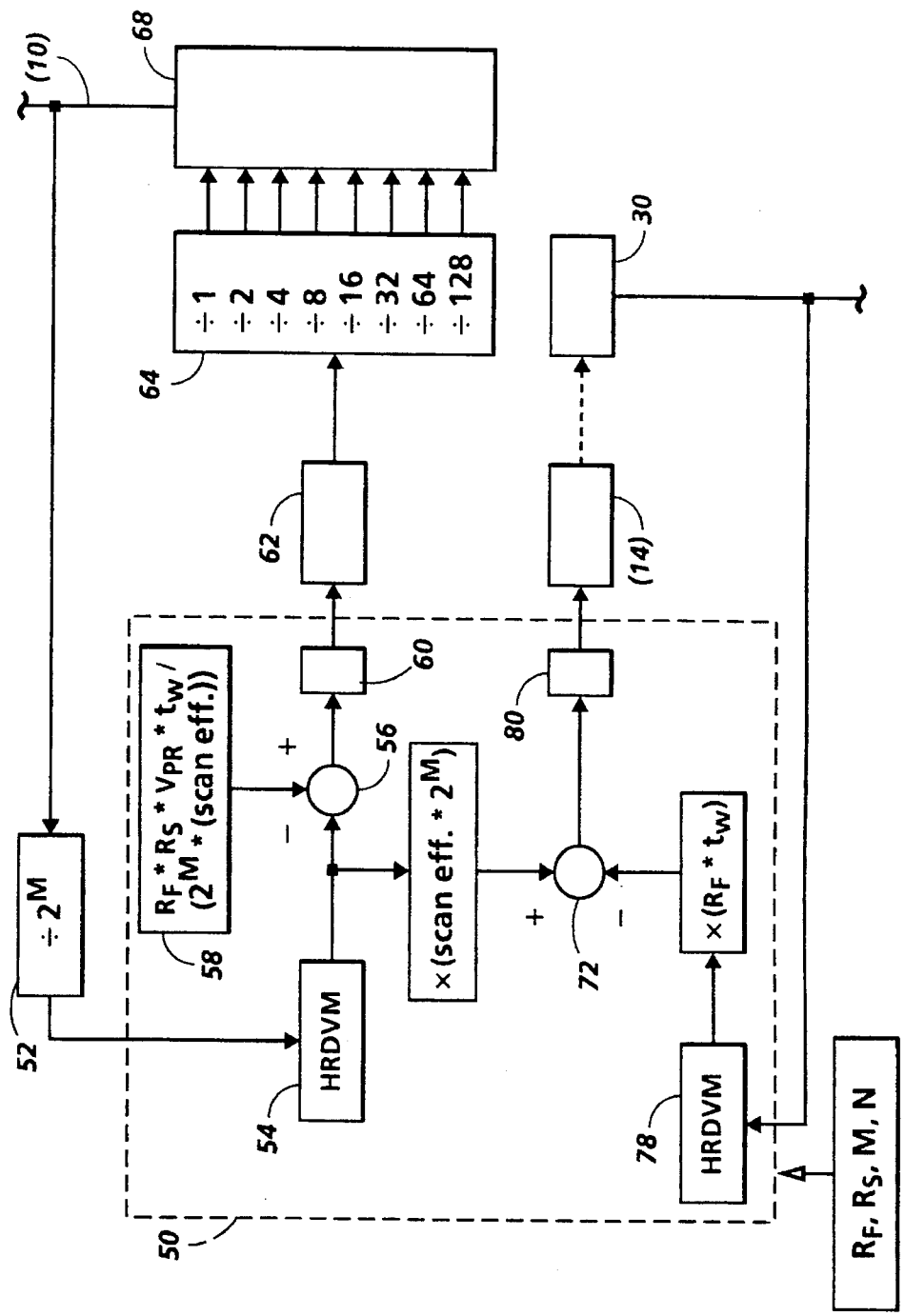
FIG. 3 is a systems diagram showing the elements of the control system of the present invention.

Having set forth the key parameters determining the resolution of an image in two dimensions, attention is directed to FIG. 3, which is a systems diagram of the resolution control system of the present invention. Most of the apparatus of the invention is embodied in a controller 50, which may preferably be in the form of a 16-bit microprocessor. The function of the controller 50 is to control the video pixel clock associated with laser source 10 and to control the angular velocity of the polygon 14 so that the ROS will be able to output an image of a particular desired resolution. In this case, the control of photoreceptor speed is done by a separate device with the value of $V_{PR}$ determined solely by desired throughput, given in units of copies per minute. This value of $V_{PR}$, as well as the desired resolution, is typically entered into the system beforehand, either externally, such as through a control panel on the printer, or as part of a "job ticket" or similar ancillary data accompanying a job to be printed.

Referring back to FIG. 2, the parameters which are necessary to output an image of a given resolution include certain parameters which are inherent in the physical apparatus and therefore generally do not change, such as the nominal target width $t_w$, the photoreceptor speed, $V_{PR}$, and the scan efficiency. However, certain other parameters relating to the desired resolution of a particular job, particularly the fast scan resolution $R_F$ and the slow scan resolution $R_S$, must be entered into the controller 50 beforehand. Usually, the resolution of an image in two dimensions $R_F$ and $R_S$ is the same (such as in a 300×300 spi resolution job), but are not necessarily equal all the time. For example, many models of ink-jet printers currently on the market print at 300×400 spi or 300×600 spi, and it may be desirable to emulate the behavior of such a printer. Thus, the desired values of $R_F$ and $R_S$ for a given job must be entered into controller 50. Also entered into controller 50 are two "divide down" values M and N, which are used to divide the frequency of a pixel clock associated with laser source 10 down to a usable frequency, in a manner which will be explained below. The controlled variables of controller 50 relate to the speed of the polygon 14 and the modulation rate of the beam emitted from laser source 10, which is controlled by a pixel clock.

As mentioned above, the velocity $V_{PR}$ of the photoreceptor 18 is preferably held constant as a practical matter, because it is typically desirable when designing an electrophotographic printing apparatus to maintain a constant photoreceptor speed so that the action of the photoreceptor can be coordinated with other portions of the printing apparatus, such as the development unit and the fuser. However, it is conceivable that the present invention could be adapted to enable a variable $V_{PR}$, or that other means may be provided for obtaining or simulating a desired resolution in the slow scan direction.

In overview, the system of the present invention embodied in controller 50 operates as two interrelated control loops: (1) an upper loop (as viewed in FIG. 3) controls the video pixel clock rate using as a reference a scalar digital value, which is in turn a function of $R_F$, $R_S$, $V_{PR}$, etc.; and (2) a lower loop that controls the angular velocity of polygon 14 by tracking the divided down video pixel clock rate with an "electronic gear box," as explained in more detail below.

In the real-time use of the present invention, a signal relating to the video pixel clock, which controls the rate of modulation of a light beam by the laser source 10, is fed into divider 52, which takes the relatively high frequency of modulation and divides it by an arbitrary value expressed as $2^M$. This division enables the relatively high frequency to be reduced to a frequency more usable by the controller 50. Broadly speaking, the divided-down pixel clock rate represents a real-time output related to the pixel clock rate; it is conceivable that a direct measurement of the pixel clock rate could be used as well, but this may be impractical with currently-available monitoring devices. The divided pixel clock output is then fed, within controller 50, into a "High Resolution Digital Velocity Measurement" scheme, herein referred to as an HRDVM and indicated as 54. The HRDVM, which is described in U.S. Pat. No. 5,237,521, incorporated herein by reference, serves to determine with sufficient accuracy and precision the cumulative position and periodic average velocity represented by its input. The HRDVM counts the number of cycles and partial cycles occurring during a sample period and outputs an instantaneous frequency. Thus, there will be output from HRDVM 54 a digital word representative of the instantaneous frequency of the divided video pixel clock.

Turning first to the feedback loop in the top portion of FIG. 3, the output of HRDVM 54, a digital word representing the divided down pixel clock rate, is fed into a software summing junction 56, where it is compared to the reference value, indicated as 58. The reference value is derived from the following definition:

$$pxlclk_{desired} = R_S * R_F * V_{PR} * t_W / (\text{scan efficiency}) \tag{1}$$

Summing junction 56 is intended to operate in real time, as the apparatus creates an image. In the digital domain, the summing operation is repeated at a high frequency over time, to have the effect of continuous recalcuation; with analog equipment, the recalculation can be continuous in fact. The output of summing junction 56 is the error in the desired pixel clock rate. After suitable compensation (discussed below), the error is fed into a 10 bit D/A converter 60 and then sent to a voltage-controlled oscillator 62, which in turn will cause an output of a frequency representative of the actual video pixel clock rate times a value representative of the desired pixel clock rate for a given desired fast-scan and/or slow-scan resolution; this output, whether in digital or analog form, is the "clock command value." (It will be apparent to one of skill in the art that the D/A converter 60 and voltage controlled oscillator 62 could be replaced with some frequency-synthesizer arrangement, wherein the application of a certain digital word will result in the output of a synthesized desired frequency.)

Because the output of voltage controlled oscillator 62 is ultimately based on a divided-down real-time measurement of the video pixel clock frequency, the output of voltage control oscillator 62 must go through a "divide by $2^N$ counter" 64 in order to be usable by the video pixel clock. Preferably, the output of voltage controlled oscillator 62 has a range of output frequencies such that the highest frequency is at least twice the lowest frequency. The divide by $2^N$ counter 64 takes the output of voltage controlled oscillator 62 and divides it by $2^N$ (where N is a number between 0 and 7) where each division has a valid output. The output of counter 64 is all the possible video pixel clock signals at a particular frequency that can represent the fast scan resolution; as will be described in detail below, a judicious selection of N enables a robust system with a wide frequency range, creating a ROS with a wide range of possible resolutions. These outputs from counter 64 are then sent to a multiplexer 68, the output of which can then be used as the pixel clock signal. Multiplexer 68 has inputs from the counter 64 and a multiplexing address control (not shown). The address control selects the desired counter output corresponding to the best N (of the many counter outputs available from counter 64) to be selected as the output of the multiplexer which is the video pixel clock rate.

The function of the upper control loop shown in FIG. 3 is to alter the frequency of the video pixel clock controlling laser source 10 so that the laser source 10 will output image data at a frequency suitable for a desired resolution. For example, a change in the fast scan or slow scan resolutions $R_F$ or $R_S$ will noticeably change the frequency of the loop, by fundamentally changing the factor with which the output of HRDVM 54 is compared. In this way the clock command value is used to control the pixel clock frequency at which laser source 10 modulates a light beam to create a desired image.

It will be noted in FIG. 3 that the output of HRDVM 54 is applied not only to the summing junction 56, but also to another control loop in a lower portion of FIG. 3. The output from HRDVM 54, representing the instantaneous frequency of the divided down video pixel clock, is first multiplied by the scan efficiency times $2^M$, and then applied to a summing junction 72. The other input to summing junction 72 is the output of a second HRDVM, indicated as 78, and is a digital word representing the actual angular velocity of the polygon 14, as "seen by" a start-of-scan detector 30 as in FIG. 1. Thus, the output of HRDVM 78 is a real-time instantaneous frequency of the scanning behavior of polygon 14. This output of HRDVM 78 is multiplied by the factor $(R_F \times t_w)$, $R_F$ being the value of the desired fast-scan resolution. Thus, summing junction 72 forms an electronic gearbox between the monitored behavior of the video pixel clock (through HRDVM 54) and the actual monitored behavior of the polygon 14 (through HRDVM 78), with the key additional factor being the desired fast scan resolution $R_F$. As with summing junction 56, the operation of summing junction 72 is effectively continuous. The mathematical basis for this electronic gearbox is developed as follows. The required angular velocity of the motor polygon assembly (MPA) causing the rotation of polygon 14 is defined as $$\omega_{MPA} = V_{PR} * R_S \quad (2)$$

Combined with equation (1) this yields, after some manipulation, $$(\text{scan efficiency} * pxlclk_{desired}) - (R_F * t_w * \omega_{MPA}) = 0 \quad (3)$$

The output of summing junction 72 is a digital word representing the inability of the MPA causing the rotation of polygon 14 to properly track the pixel clock frequency. This error signal, called a "polygon command value," is used, after properly applied compensation, to control, for example, a PWM amplifier that controls voltage to the motor of the MPA. In brief, the means for determining a polygon command value includes means for continuously summing a value related to the rotational velocity of the polygon mirror (from HRDVM 78) and a value related to the pixel clock rate (from HRDVM 54). The electro-mechanical means for controlling the rotational velocity of the polygon mirror in response to the polygon command value is here indicated as 80, and may include any system, embodied in hardware and/or software, for transferring the real-time polygon command value to a control signal affecting the velocity of the polygon 14. The resulting velocity of polygon 14 will have a real-time effect on signals to the start-of-scan detector 30, which feeds into HRDVM 78, completing the feedback loop.

In either feedback loop shown in FIG. 3, the values from summing junctions 56 and 72 preferably input into a compensation filter means (not shown), containing at least one integrator term, in order to stabilize closed-loop control of the video pixel clock frequency and the motor for polygon 14, before conversion into a frequency for operating the pixel clock or a motor. Further, the start-of-scan signal from sensor 30 may be suitably conditioned for optimal performance when applied to HRDVM 78.

What follows below are a set of case studies showing the operation of the present invention in a type of ROS, with particular attention given to the operation of voltage controlled oscillator 62, counter 64, and multiplexer 68.

Assume that the ROS in question has a target width $t_w$ of 12 inches, with a scan efficiency of 80%. Assume that the voltage control oscillator has a 2:1 range with a maximum output frequency $pxlclk_{max}$ of 160 MHz. Assume a constant photoreceptor velocity $V_{PR}$ of 10 inches per second. Given these assumptions, the maximum resolution of the system is $$(R_S \times R_F)_{max} = pxlclk_{max} * (\text{scan eff.})/(V_{PR} * t_w) = 10^6 (\text{spots/in})^2. \quad (4)$$

In this design, the output of the D/A converter 60 is given as $VCO_{COMMAND}$, which is sent to voltage controlled oscillator 62. For a voltage controlled oscillator with a 2:1 frequency range and a maximum output of $pxlclk_{max}$, the relationship describing the output of the voltage controlled oscillator 62 is $$VCO_{OUTPUT} = (pxlclk_{MAX}/2) + (pxlclk_{MAX}/2 * VCO_{COMMAND}/1023)$$

where $$VCO_{COMMAND} \text{ is an integer and } 0 \leq VCO_{COMMAND} \leq 1023$$

Incorporating the function of counter 64 into this equation yields:

$$pxlclk = pxlclk_{MAX} * (1 + VCO_{COMMAND}/1023)/2^{N+1} \quad (5)$$

Because the pixel clock frequency is directly related to the product of $R_S$ and $R_F$, an important design relationship can be derived from the above equation to yield:

$$R_S * R_F/(R_S * R_F)_{max} = (1 + VCO_{COMMAND}/1023)/2^{N+1}$$

Substituting into this equation the architectural assumptions from equation (4) yields the main design relationship:

$$R_S * R_F = 10^6 (1 + VCO_{COMMAND}/1023)/2^{N+1} \quad (6)$$

This equation (6) has a function which is important to the illustrated embodiment of the present invention, namely, the proper operation of counter 64, which determines what level of dividing-down is necessary for optimal operation of the pixel clock. Counter 64 is able to output a frequency at various time-resolutions, each frequency being a multiple of 2 of another, as shown in FIG. 3. In practical operation of the system of the present invention, after the selection of a suitable resolution of the pixel clock output, it is generally necessary for suitable operation with the HRDVM 54 to select the correct value of M used in the the divide-by-$2^M$ counter 52 thus enabling an optimal use of the HRDVM 54. Given the above assumptions, each value of N will enable a different range of possible resolutions ($R_S \times R_F$), as in the following table:

| N | $(R_S*R_F)_{min}(spots/in)^2$ | $(R_S*R_F)_{max}(spots/in)^2$ |
|---|---|---|
| 0 | $5* 10^5$ | $10^6$ |
| 1 | $2.5* 10^5$ | $5* 10^5$ |
| 2 | $1.25* 10^5$ | $2.5* 10^5$ |
| 3 | $6.25* 10^4$ | $1.25* 10^5$ |

CASE I: a fax document with $R_F=R_S=12$ spots/mm

1. $R_F*R_S=(12*25.4)^2(spots/in)^2=9.29*10^4(spots/in)^2$, therefore use the table to choose N=3. This step includes the metric-to-English conversion.

2. With N=3, solve for $VCO_{COMMAND}$ in equation (6) using the specified $R_S$ and $R_F$. The result is $VCO_{COMMAND}=497$.

3. Equation (5) yields pxlclk=$160*10^6(1+497/1023)/2^4$= 14.86 mhz.

4. Choose M so that the pxlclk/$2^M$ signal is between 1 kHz and 4 kHz. This range of frequency is given as a typical practical limitation of the controller speed and resolution in applying the HRDVM algorithm. If M=13 for the divide by $2^M$ counter, pxlclk/$2^M$=1.814 kHz.

5. Check the final result by calculating the actual $R_F$ and $R_S$ using N=3 and $VCO_{COMMAND}$=497 using equation (6) and taking the square root of $R_F \times R_S$. The result is $R_F=R_S=$ 11.9975 spots/mm.

CASE II: an "oddball" test document with $R_F$=451 spots/in and $R_S$=363 spots/in 1. $R_F*R_S=(451*363)(spots/in)^2=1.637*10^5(spots/in)^2$ therefore use the table to choose N=2.

2. with N=2, solve for $VCO_{COMMAND}$ in equation (6) using the specified $R_S$ and $R_F$. The result is $VCO_{COMMAND}=$ 316.

3. equation (5) yields, pxlclk=$160*10^6*(1+316/1023)/2^3$= 26.18 MHz.

4. Choose M so that the pxlclk/$2^M$ signal is between 1 kHz and 4 kHz, i.e., choose M=14 for the divide by $2^M$ counter, thus pxlclk/$2^M$=1.598 kHz.

In a practical embodiment of the invention, the use of HRDVM's is desirable because the proper performance of the invention as whole depends on precise and accurate coordination of the polygon mirror rotation with the pixel clock. Real-time monitoring of both the pixel clock and the behavior of the polygon 14 must be of a sufficient precision that there is minimal error propagation affecting the function of the "electronic gearboxes." A key source of such errors derives from the "loss" of partial cycles of the pixel clock and polygon 14 when instantaneous velocities are repeatedly measured. The advantage of HRDVM's, particularly as described in the referenced patent, is that the HRDVM's take into account partial cycles when counting the number of cycles which occur in a given time frame. Thus, as the velocities of the pixel clock and polygon are continuously monitored, as they are in the invention, errors relating to lost partial cycles will not accumulate and cause drift or other anomalies in the output of the HRDVM's, nor in the outputs of the electronic gearboxes.

While the invention has been described with reference to the structure disclosed, it is not confined to the details set forth, but is intended to cover such modifications or changes as may come within the scope of the following claims.

We claim:

1. A method of controlling a raster output scanner having a light source for emitting a modulated beam according to digital data at a pixel clock rate and a rotatable polygon mirror for causing the modulated beam to scan across a photosensitive surface in a fast-scan direction, the photosensitive surface moving in a slow-scan direction substantially perpendicular to the fast-scan direction, comprising the steps of:

operating the scanner by modulating the beam at a pixel clock rate and causing the modulated beam to scan across the photosensitive surface;

measuring the pixel clock rate and the rotational velocity of the polygon mirror in real time as the scanner is operating;

determining a clock command value as a function of a value related to the real-time measured pixel clock rate and a value related to a desired resolution in the fast-scan direction and a desired resolution in the slow-scan direction of an image to be created on the photosensitive surface;

controlling the pixel clock rate in response to the clock command value;

determining a polygon command value as a function of the value related to the real-time measured pixel clock rate, a value related to a desired resolution in the fast-scan direction of an image to be created on the photosensitive surface, and a value related to the real-time measured rotational velocity of the polygon mirror; and controlling the rotational velocity of the polygon mirror in response to the polygon command value.

2. The method of claim 1, further comprising the step of:

counting partial cycles of a real-time output related to the pixel clock rate within a predetermined time frame to obtain the value related to the pixel clock rate.

3. The method of claim 1, further comprising the step of:

counting partial cycles of rotation of the polygon mirror within a predetermined time frame to obtain the value related to the rotational velocity of the polygon mirror.

4. The method of claim 1, wherein the step of determining a clock command value includes the step of continuously summing values related to a desired slow-scan resolution of an image to be recorded on the photosensitive surface with the value related to a desired resolution in the fast-scan direction of an image to be created on the photosensitive surface.

5. The method of claim 1, further comprising the steps of:

converting the clock command value to a clock frequency;

dividing the clock frequency by $2^N$, where N is an integer, to obtain a pixel clock rate; and modulating the modulated beam in the light source at the pixel clock rate.

6. A raster output scanner, comprising:

a photosensitive surface;

means for moving the photosensitive surface in a slow-scan direction;

a light source for emitting a modulated beam according to digital data at a pixel clock rate;

a rotatable polygon mirror for scanning the modulated beam across a surface in a fast-scan direction;

means for measuring the pixel clock rate and a rotational velocity of the polygon mirror in real time as the scanner is operating;

means for determining a clock command value as a function of a value related to the real-time measured pixel clock rate and a value related to a desired resolution in the fast-scan direction and a desired resolution in the slow-scan direction of an image to be created on the photosensitive surface;

means for controlling the pixel clock rate in response to the clock command value;

means for determining a polygon command value as a function of the value related to the real-time measured pixel clock rate, a value related to a desired resolution in the fast-scan direction of an image to be created on the photosensitive surface, and a value related to the real-time measured rotational velocity of the polygon mirror; and means for controlling the rotational velocity of the polygon mirror in response to the polygon command value.

7. The scanner of claim 6, further comprising:

means for counting partial cycles of a real-time output related to the pixel clock rate within a predetermined time frame to obtain the value related to the pixel clock rate.

8. The scanner of claim 6, further comprising:

means for counting partial cycles of rotation of the polygon mirror within a predetermined time frame to obtain the value related to the rotational velocity of the polygon mirror.

9. The scanner of claim 6, wherein the means for determining a polygon command value includes means for continuously summing a value related to the rotational velocity of the polygon mirror and a value related to the pixel clock rate.

10. The scanner of claim 6, further comprising:

means for converting the clock command value to a clock frequency;

means for dividing the clock frequency by $2^N$, where N is an integer, to obtain a pixel clock rate; and means for modulating the modulated beam in the light source at the pixel clock rate.

\* \* \* \* \*